…

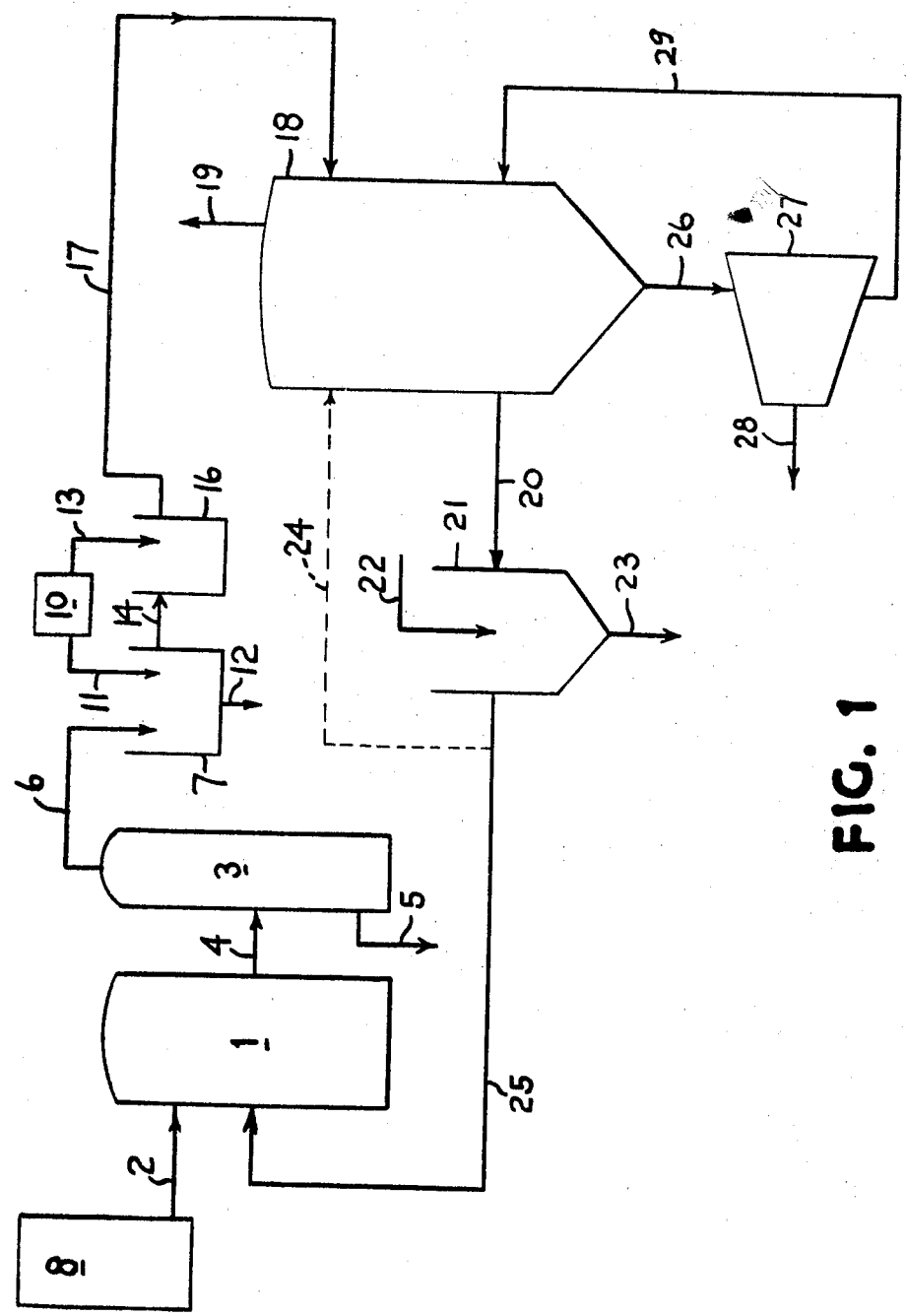

United States Patent Office 3,749,557
Patented July 31, 1973

3,749,557
METHOD OF PRODUCING TETRAALKYLLEADS
Ephraim A. Cuevas, Corpus Christi, Tex., assignor to PPG Industries, Inc., Pittsburgh, Pa.
Filed July 13, 1970, Ser. No. 54,409
Int. Cl. C01d 11/02; B01d 11/02; C01g 21/00
U.S. Cl. 23—297
7 Claims

ABSTRACT OF THE DISCLOSURE

A process for reducing the lead content of lithium chloride solutions is described which involves dilution of aqueous lead chloride solutions to precipitate lead chloride crystals therefrom. In one embodiment the dilute solutions of lithium chloride produced in the precipitation step are used to quench reactor masses formed in the manufacture of alkyllead compounds.

BACKGROUND OF THE INVENTION

In Canadian Pat. 813,925 a process is described for the production of tetraalkylleads utilizing metallic lithium as an essential ingredient. The process described in this patent may be conveniently illustrated by the following equation:

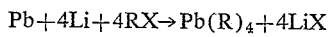

$$Pb + 4Li + 4RX \rightarrow Pb(R)_4 + 4LiX$$

where RX represents a hydrocarbon halide, X represents chlorine, bromine and/or iodine and R represents an unsubstituted alkyl, alkenyl or aryl group. In particular the specific reactions of most interest are those producing tetramethyllead and tetraethyllead using methyl chloride and ethyl chloride respectively as the alkyl halide constituent of the reaction system.

In the production of these alkyllead materials, lithium chloride is also produced as shown by the equation. This lithium chloride is usually recovered as an aqueous solution of lithium chloride formed by water washing the entire reaction mass and phase separating the alkyllead from the aqueous lithium chloride. These lithium chloride solutions are typically evaporated to provide for the recovery of lithium chloride as crystals. Lithium chloride crystals so recovered are subsequently electrolyzed to provide lithium metal for use in the basic reaction for the production of further quantities of tetraalkyllead.

These lithium chloride solutions are found to contain lead in appreciable quantities (0.4 percent by weight or more). It has been found that lithium chloride crystals of suitable purity for use in a subsequent electrolysis to produce lithium metal cannot be recovered from aqueous lithium chloride solutions unless the lead content of such lithium chloride solutions is maintained below 0.3 percent by weight. In order to maintain such lead levels the solutions undergoing evaporation or crystallization usually are treated in whole or in part with chemicals to precipitate the lead contained therein. In this manner the lead content of the evaporator or crystallizer solution is maintained below 0.3 percent by weight.

THE INVENTION

By virtue of the instant invention applicant has taken advantage of the fact that lead in aqueous lithium chloride solutions has a reverse solubility and that this phenomenon can be used to remove lead from such solutions. Thus, in accordance with the instant invention lithium chloride solutions containing appreciable quantities of lead are treated with water to provide for more dilute solutions of lithium chloride so that dissolved lead which is less soluble in dilute lithium chloride than in concentrated lithium chloride may be precipitated therefrom as lead chloride ($PbCl_2$).

In a further embodiment, the more dilute solutions of lithium chloride produced during dilution procedures designed to precipitate lead chloride are utilized to quench reactor masses in which lithium chloride is contained as an essential ingredient. In this embodiment lithium chloride solutions present in the evaporation system of a tetraalkyllead plant utilizing the aforementioned patented lithium process can be controlled to maintain the lead concentration in the evaporators at an acceptable level for the production of high purity lithium crystals while utilizing the dilute aqueous solution produced to quench reactor masses.

For a more complete understanding of the instant invention, reference is made to the accompanying drawing which is a diagrammatic illustration of the instant invention. In the drawing the invention is described as it applies to a typical operation of a tetraalkyllead facility in which lithium metal has been utilized in conjunction with lead metal and an alkyl halide in accordance with the above equation to produce a tetraalkyllead compound. Thus, as shown, the discharge from an autoclave 8 in which lithium metal, lead metal and alkyl chlorides have been reacted to produce tetraalkyllead and lithium chloride as the major constituents is fed to a hydrolyzing vessel 1 via line 2. In the hydrolyzer 1 thorough mixing of the tetraalkyllead compound and the lithium chloride with the water present in the stream in line 2 takes place. The solution contained in vessel 1 is then fed to a phase separator 3 via line 4. The tetraalkyllead compounds are removed via line 5 for further processing and the aqueous solutions containing lithium chloride are removed via line 6 and passed into a vessel 7.

In vessel 7 lithium chloride solutions are treated with aqueous solutions of hydrochloric acid fed through line 11 to reduce and thereby control the hydroxyl ion concentration of the lithium chloride solutions fed thereto to provide between about 2 to about 8 milliequivalents per 100 grams of solution. This control of hydroxyl ion concentration precipitates the lead contained in the lithium chloride solutions in vessel 7 and the precipitated lead is removed via line 12 as a lead hydroxy chloride.

The resulting, lead depleted, lithium chloride solutions are then passed into a second vessel 16 via line 14 where further acid additions made through line 13 substantially neutralize the solution and provide a hydroxyl ion concentration of 0 milliequivalents per 100 grams of solution or less. The solution leaving vessel 16 through line 17 contains essentially lithium chloride, small quantities of other alkali metal chlorides such as sodium chloride that may be present and very small quantities of dissolved lead. The lead concentration at this point has been reduced substantially below what it was at the feed point. The lithium chloride solution is then passed into an evaporator 18 where water is constantly removed from the solution via line 19 to concentrate the solution to a lithium chloride concentration substantially in excess of 50 percent by weight. The lead concentration in the evaporator is controlled to provide 0.3 percent lead by weight or less basis the weight of the solution.

In accordance with the instant invention a substantial improvement is made in the process by providing this control of lead concentration in the evaporator 18 by utilizing a recycle stream from the evaporator 18. This recycle stream is passed via line 20 into a tank 21. In tank 21 substantial quantities of water are introduced via line 22 thereby substantially diluting the solution contained in tank 21. By diluting for example a lithium chloride solution from a 56 percent lithium chloride solution to a value of 10 percent lithium chloride by weight or less, lead chloride present therein is readily precipitated from the solution and is removed via line 23. This stream with the lead removed may be returned to the evaporator to thereby reduce the lead content therein or it may be passed to the hydrolyzer 1 via line 25 and used therein to dissolve lithium chloride.

In the embodiment in which the solution is passed into line 25 from tank 21, advantage is taken of the substantial quantities of water in the resulting solution. This solution is typically warm (45° C.) and because of its high water content, serves effectively as washing water for the reaction masses discharged from the autoclave 8 of an alkyllead plant. Thus, the solutions produced during the reduction of the lead content of the evaporator solution may be employed in quenching and dissolving lithium chloride recovered from the alkyllead plant thereby obtaining two advantages. Where desired, a portion of the purified solutions recovered from the tank 21 may be recycled through line 24 directly to the evaporator 18 and a portion of the solution may be utilized to quench the lithium chloride-tetraalkyllead compounds coming from the alkyllead plant.

In the flow sheet shown in the drawing, pH adjustment to control the hydroxyl ion concentration of evaporator feed solutions is shown as the method used to precipitate lead therefrom. This is only one method that may be employed to accomplish this goal. Thus, precipitation of lead from these solutions as lead sulfide is another method of accomplishing lead removal from this stream. In such instances the sulfide ions may be supplied by feeding hydrogen sulfide to these solutions or by adding an alkali metal sulfide thereto, preferably lithium sulfide.

In a typical operation of the instant process a feed solution containing 30 percent lithium chloride. 0.17 percent sodium chloride and 413 parts per million lead was fed to the evaporator 18 via line 17. In the evaporator-crystallizer 18 water was evaporated from the solution through line 19 to provide a lithium chloride solution in evaporator 18 containing 56 percent by weight lithium chloride, 0.39 percent sodium chloride, and 0.3 percent dissolved lead. This concentrated solution is passed from the evaporator-crystallizer 18 continuously via line 26 to the centrifuge 27. Solid crystals of lithium chloride are removed via line 28 and contain typically 99.4 percent lithium chloride, 0.58 percent sodium chloride and 90 parts per million lead. Liquor recovered from crystallizer 27 is recycled via line 29 to the evaporator 18.

A 3 percent by weight recycle of the total volume of solution maintained in evaporator-crystallizer 18 is employed during the operation of the evaporator-crystallizer 18. This recycle stream is passed through line 20 to the tank 21. To this solution, water is added at a rate of 3,109 grams per hour. The solution temperature in tank 21 is about 45° C. Lead is precipitated in vessel 21 as lead chloride and is removed via line 23. The remaining solution is then fed from the tank 21 to a hydrolyzer 1. In hydrolyzer 1 it is contacted with the reactor mass from an autoclave in which metallic lead, metallic lithium and ethyl chloride have been reacted in accordance with the reaction of the equation in col. 1 herein but with excess ethyl chloride basis the stoichiometry being used. The resulting solution from the hydrolyzer 1 is then passed via line 4 to a phase separator 5 where the tetraethyllead is separated from the aqueous solutions and is removed via line 5. The aqueous solution removed via line 6 is then fed to a tank 7. Tank 7 is provided with an inlet line 11 from tank 10. Hydrochloric acid contained in tank 10 is added to tank 7 via line 11 to provide a hydroxyl ion milliequivalent concentration in the solution contained therein of 2.8 milliequivalents per 100 grams of solution. Lead hydroxy chloride is thereby precipitated from the solution in tank 7 and is removed via line 12. The lead depleted solution is then fed via line 14 to a second vessel 16 where the pH is adjusted with hydrochloric acid to a pH of 7. The milliequivalent concentration of hydroxyl ions in the solution is 0 milliequivalent per 100 grams of solution at this point. The solution now contains 30 percent lithium chloride, 0.17 percent sodium chloride and 413 parts per million lead. The solution is then passed to evaporator-crystallizer 18 where it is processed for recovery of solid lithium chloride.

As can be readily seen from the above example by utilizing a dilution technique, lead accumulating as dissolved lead chloride in evaporator-crystallizer 18 is easily removed from the evaporator-crystallizer system and the lead content of evaporator-crystallizer solutions thereby easily controlled. Further, where desired, diluted lithium chloride streams formed by this invention can readily be utilized to quench tetraethyllead or tetramethyllead reaction masses such as are produced in Canadian Pat. 813,925 thereby increasing the efficiency of that or a similar process by dissolving lead in this stream and thereby eliminate the need for any further additional reagents other than water.

In those instances where the hydroxyl ion concentration of the solution entering tank 7 is 0 or below, the tank 10 will contain an alkali in lieu of the acid above described. Thus, tank 10 in these instances may conveniently contain an alkali metal hydroxide or an alkaline earth metal hydroxide, preferably lithium hydroxide. When acid is used in tank 10 it is typically a strong mineral acid such as hydrochloric, phosphoric or nitric and preferably it is hydrochloric. In accomplishing the dilution of solutions of lithium chloride present in the stream fed to vessel 21, sufficient water is added to provide a final solution in vessel 21 having a lithium chloride concentration of less than 10 percent by weight, preferably between 3 to 8 percent by weight. Adjustment of the lithium chloride concentration in these ranges effectively precipitates lead chloride from these solutions so that the dissolved lead content of such solutions can be readily reduced.

While the invention has been described with reference to certain specific examples and illustrative embodiments, it is of course not intended to be so limited except insofar as appears in the accompanying claims.

I claim:

1. In a process for recovering lithium chloride from a reaction mass containing lithium chloride and alkyllead compounds wherein the mass is contacted with water to form a lithium chloride solution, the improvement comprising contacting said reaction mass with a lead depleted lithium chloride solution having a lithium chloride content of 10 percent by weight or less to thereby form a more concentrated lithium chloride solution, evaporating the more concentrated solution to provide a lithium chloride solution containing at least 56 percent by weight lithium chloride, removing a portion of this latter solution from the evaporation zone and diluting it with water to provide a lithium chloride solution of 10 percent by weight or less lithium chloride to thereby precipitate lead chloride therefrom, recovering the lithium chloride solution depleted in lead content and using this solution so recovered to contact further reaction masses containing lithium chloride.

2. The process of claim 1 wherein the lead depleted lithium chloride solution has a lithium chloride concentration of from 3 to 8 percent by weight.

3. In the process of manufacturing tetraalkyllead compound by reaction of lead, lithium and hydrocarbon chloride in a reactor wherein the reactor product is contacted with water, an aqueous lithium chloride solution containing at least 0.4 percent by weight dissolved lead is produced thereby and lithium chloride is crystallized from lead containing aqeuous lithium chloride solution, the improvement which comprises introducing lead containing aqueous lithium chloride solution to an evaporator, evaporating water from the solution in the evaporator to form a solution having a lithium chloride concentration of at least 50 percent by weight, maintaining the lead concentration of the solution in the evaporator at 0.3 percent by weight or less by withdrawing a stream of the solution from the evaporator, diluting the stream with water to form a lithium chloride solution of 10 percent by weight or less of lithium chloride to thereby precipitate lead contained therein as lead chloride, removing precipitated lead chloride from the solution thereby producing dilute lithium chloride solution of reduced lead content, and using such dilute lithium chloride solution of reduced lead content to contact further quantities of reactor product.

4. The process of claim 3 wherein the stream removed from the evaporator represents about 3 percent by weight of the solution in the evaporator.

5. The process of claim 3 wherein the stream removed from the evaporator is diluted with water to a lithium chloride concentration of from 3 to 8 percent by weight.

6. The process of claim 3 wherein dilute lithium chloride solution of reduced lead content is recycled to the evaporator.

7. In the process of manufacturing tetraalkyllead compound by reaction of lead, lithium and hydrocarbon chloride in a reactor wherein the reactor product is contacted with water, an aqueous lithium chloride solution containing 0.4 percent or more by weight of dissolved lead is produced thereby and lithium chloride is crystallized from lead containing aqueous lithium chloride solution, the improvement which comprises introducing lead containing aqueous lithium chloride solution to an evaporator, maintaining the lead concentration in the solution in the evaporator at 0.3 percent by weight or less by withdrawing a stream from the evaporator, diluting the stream with water to form a lithium chloride solution of from 3 to 8 percent by weight lithium chloride to thereby precipitate lead contained therein as lead chloride, separating precipitated lead chloride from the diluted solution thereby producing dilute lithium chloride solution of reduced lead content, introducing such lithium chloride solution of reduced lead content into the evaporator, evaporating water from the solution in the evaporator to form a solution having a lithium chloride concentration of at least 50 percent by weight, crystallizing lithium chloride from the solution in the evaporator and recovering lithium chloride crystalline product.

References Cited
UNITED STATES PATENTS 2,703,272    3/1955    Fuchsman _____ 23—89

OTHER REFERENCES

Seidell, Journal of Inorg. and Org. Cds., vol. 2 (1928), pp. 1254–1258.

NORMAN YUDKOFF, Primary Examiner

S. J. EMERY, Assistant Examiner

U.S. Cl. X.R.

23—89, 97, 299, 300, 302, 305, 312 AH; 260—437